(12) United States Patent
Yanagisawa et al.

(10) Patent No.: US 11,400,656 B2
(45) Date of Patent: Aug. 2, 2022

(54) MANUFACTURING METHOD OF ACTUATOR

(71) Applicant: NIDEC SANKYO CORPORATION, Nagano (JP)

(72) Inventors: Kazuhiko Yanagisawa, Nagano (JP); Toshiyuki Watanabe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 290 days.

(21) Appl. No.: 16/383,679

(22) Filed: Apr. 15, 2019

(65) Prior Publication Data

US 2019/0315070 A1 Oct. 17, 2019

(30) Foreign Application Priority Data

Apr. 16, 2018 (JP) .............................. JP2018-078295

(51) Int. Cl.
*B29C 65/48* (2006.01)
*B29C 65/78* (2006.01)
*H02K 33/16* (2006.01)

(52) U.S. Cl.
CPC .......... *B29C 65/48* (2013.01); *B29C 65/7847* (2013.01); *H02K 33/16* (2013.01); *B29K 2995/0046* (2013.01)

(58) Field of Classification Search
None
See application file for complete search history.

(56) References Cited

U.S. PATENT DOCUMENTS 7,550,885 B2  6/2009  Takagi et al.
2019/0070635 A1*  3/2019  Takeda .................... B06B 1/045

FOREIGN PATENT DOCUMENTS

| CN | 202906621 | 4/2013 |
| CN | 107534374 | 1/2018 |
| JP | 2017135948 | 8/2017 |
| WO | 2016194918 | 12/2016 |

OTHER PUBLICATIONS

"Office Action of China Counterpart Application", dated Sep. 27, 2020, with English translation thereof, pp. 1-11.

* cited by examiner

*Primary Examiner* — Christopher T Schatz
(74) *Attorney, Agent, or Firm* — JCIPRNET

(57) ABSTRACT

A manufacturing method of an actuator having a support body, a movable body, a viscoelastic member adhesively bonded to one side member of the support body and the movable body by a first adhesive layer, and a magnetic drive circuit structured to relatively move the movable body may include, for adhesively bonding the viscoelastic member to the one side member by the first adhesive layer, a first step in which the viscoelastic member is disposed on a side of one face of a first jig, a second step in which the viscoelastic member and the one side member are overlapped with each other through an adhesive, a third step in which the adhesive is hardened to adhesively bond the one side member and the viscoelastic member to each other by the first adhesive layer, and a fourth step in which the first jig is separated from the viscoelastic member.

10 Claims, 12 Drawing Sheets

MANUFACTURING METHOD OF ACTUATOR

CROSS REFERENCE TO RELATED APPLICATION

The present application claims priority under 35 U.S.C. § 119 to Japanese Application No. 2018-078295 filed Apr. 16, 2018, and the entire content of which is incorporated herein by reference.

TECHNICAL FIELD

At least an embodiment of the present disclosure may relate to a manufacturing method of an actuator which is structured to vibrate a movable body.

BACKGROUND

As a device structured to notify information by vibration, an actuator has been proposed which includes a movable body having a permanent magnet and a support body having a coil facing the permanent magnet. In the actuator, a technique has been proposed that a viscoelastic member such as silicone gel is disposed in a portion where the support body and the movable body are faced each other and a resonance frequency when the movable body is displaced with respect to the support body is controlled by the viscoelastic member to suppress the resonance of the movable body (see Japanese Patent Laid-Open No. 2017-135948 (Patent Literature 1)). Further, in Patent Literature 1, a technique is proposed that the viscoelastic member is fixed to the support body and the movable body with an adhesive.

In a case that a viscoelastic member such as silicone gel is fixed to a support body and a movable body with an adhesive like an actuator described in Patent Literature 1, for example, as shown in FIG. 11, a viscoelastic member 91x conveyed by a conveyance head 1010x is placed on a yoke 81x of a movable body through an adhesive 960x and then, the conveyance head 1010x is separated from the viscoelastic member 91x and, after that, the adhesive 960x is hardened.

However, the viscoelastic member 91x has a strong adhesive force and thus the conveyance head 1010x and the viscoelastic member 91x are adhered to each other. Therefore, when the conveyance head 1010x is tried to be separated from the viscoelastic member 91x before the adhesive 960x is hardened, the viscoelastic member 91x may be moved while the viscoelastic member 91x is adhered to the conveyance head 1010x. In this case, the production efficiency is deteriorated. On the other hand, in a method that the conveyance head 1010x is separated from the viscoelastic member 91x after the adhesive 960x has been hardened, the productivity has extremely deteriorated. This problem is not limited to the case that the conveyance head 1010x is utilized and similarly occurs in a case that the viscoelastic member 91x is conveyed by other methods.

SUMMARY

In view of the problems described above, the present disclosure provides a manufacturing method of an actuator which is capable of adhesively bonding a viscoelastic member to one side member of a support body and a movable body efficiently.

To solve the above mentioned problems, the present disclosure provides a manufacturing method of an actuator, and the actuator includes a support body, a movable body which is movable with respect to the support body, a viscoelastic member which is adhesively bonded to one side member of a member structuring the support body and a member structuring the movable body by a first adhesive layer, and a magnetic drive circuit structured to relatively move the movable body with respect to the support body. The manufacturing method includes steps for adhesively bonding the viscoelastic member to the one side member by the first adhesive layer, and the steps includes a first step in which the viscoelastic member is disposed on a side of one face of a first jig, a second step in which the viscoelastic member and the one side member are overlapped with each other through an adhesive, a third step in which the adhesive is hardened to adhesively bond the one side member and the viscoelastic member to each other by the first adhesive layer, and a fourth step in which the first jig is separated from the viscoelastic member.

In at least an embodiment of the present disclosure, when a viscoelastic member is disposed on one face side of the first jig in the first step, the viscoelastic member is adhered to the first jig by its own adhesive force. Therefore, the conveyance head or a pair of tweezers which are used to convey the viscoelastic member can be easily separated from the viscoelastic member. Further, after the viscoelastic member and the one side member are overlapped with each other through an adhesive in the second step, when the adhesive is hardened and the viscoelastic member is adhesively bonded to the one side member in the third step, in the fourth step, in a case that the first jig is to be separated from the viscoelastic member, the viscoelastic member is prevented from moving while the viscoelastic member is adhered to the first jig. Therefore, the viscoelastic member can be adhesively bonded to the one side member of the support body and the movable body efficiently.

In at least an embodiment of the present disclosure, the one side member is previously disposed on one face of a second jig and, in the second step, the first jig and the second jig are overlapped with each other so that the viscoelastic member and the one side member are overlapped with each other through the adhesive.

In this case, it may be structured that a plurality of the viscoelastic members is previously disposed on the one face of the first jig, a plurality of the one side members is previously disposed on the one face of the second jig and, in the second step, the first jig and the second jig are overlapped with each other so that the plurality of the viscoelastic members and the plurality of the one side members are respectively overlapped with each other through the adhesive. According to this structure, the viscoelastic member can be adhesively bonded to the one side member efficiently.

In at least an embodiment of the present disclosure, in the second step, the one face of the second jig is set to face upward and the one face of the first jig is set to face downward, and the first jig and the second jig are overlapped with each other. According to this structure, the one face of the second jig is set to face upward and thus the second jig is not required to be structured so as to hold the one side member. Further, in the first jig, the viscoelastic member is adhered to the first jig by its own adhesive force and thus, even when the one face of the first jig is set to face downward, the viscoelastic member is hard to drop from the first jig.

In at least an embodiment of the present disclosure, in the first step, the conveyance head disposes the viscoelastic member on the one face of the first jig and, after that, and before the second step, the conveyance head is separated from the viscoelastic member.

In at least an embodiment of the present disclosure, the conveyance head includes a suction part structured to vacuum-suck the viscoelastic member, and a bar-shaped member movable between an upper side position where the bar-shaped member is retreated to an upper side with respect to the suction part and a lower side position where the bar-shaped member is protruded to a lower side with respect to the suction part and, when the conveyance head is to be separated from the viscoelastic member, the bar-shaped member is protruded to the lower side from the suction part. According to this structure, even in a case that the viscoelastic member is adhered to the conveyance head by its own adhesive force, when the conveyance head is to be separated from the viscoelastic member, the bar-shaped member becomes a contacted state with the viscoelastic member. Therefore, the adhesive force between the conveyance head and the viscoelastic member is decreased and thus the conveyance head can be easily separated from the viscoelastic member.

In at least an embodiment of the present disclosure, the viscoelastic member is a gel-state member. An adhesive force of a gel-state member is remarkably strong. However, even in this case, the viscoelastic member can be adhesively bonded to the one side member efficiently.

In at least an embodiment of the present disclosure, after the fourth step, the other side member of the member structuring the support body and the member structuring the movable body and the viscoelastic member are adhesively bonded to each other by a second adhesive layer. According to this structure, the viscoelastic member surely follows movement of the movable body and thus resonance of the movable body can be prevented effectively. Also in this case, when the other side member and the viscoelastic member are to be adhesively bonded to each other by the second adhesive, the conveyance head and the like are not required to touch the viscoelastic member and thus the viscoelastic member can be adhesively bonded to the other side member efficiently.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10A shows a standby state of a conveyance head, FIG. 10B shows a state that the conveyance head has been lowered, FIG. 10C shows a state that the conveyance head has been moved upward, and FIG. 10D shows a state that an elastic member has been pressed on a first jig.

DETAILED DESCRIPTION

At least an embodiment of the present disclosure will be described below with reference to the accompanying drawings. In the following descriptions, "X" is indicated in a linearly moving direction of a movable body 6 (second direction, vibration direction), "Z" is indicated in a first direction intersecting the second direction "X", and "Y" is indicated in a third direction intersecting the first direction "Z" and the second direction "X". In this case, "X1" is indicated on one side in the second direction "X", "X2" is indicated on the other side in the second direction "X", "Z1" is indicated on one side in the first direction "Z", "Z2" is indicated on the other side in the first direction "Z", "Y1" is indicated on one side in the third direction "Y", and "Y2" is indicated on the other side in the third direction "Y". Further, in the following descriptions, a structure that a support body 2 holds a coil and a movable body 6 holds a permanent magnet will be described below as at least an embodiment of the present disclosure.

(Entire Structure)

Figure 1:
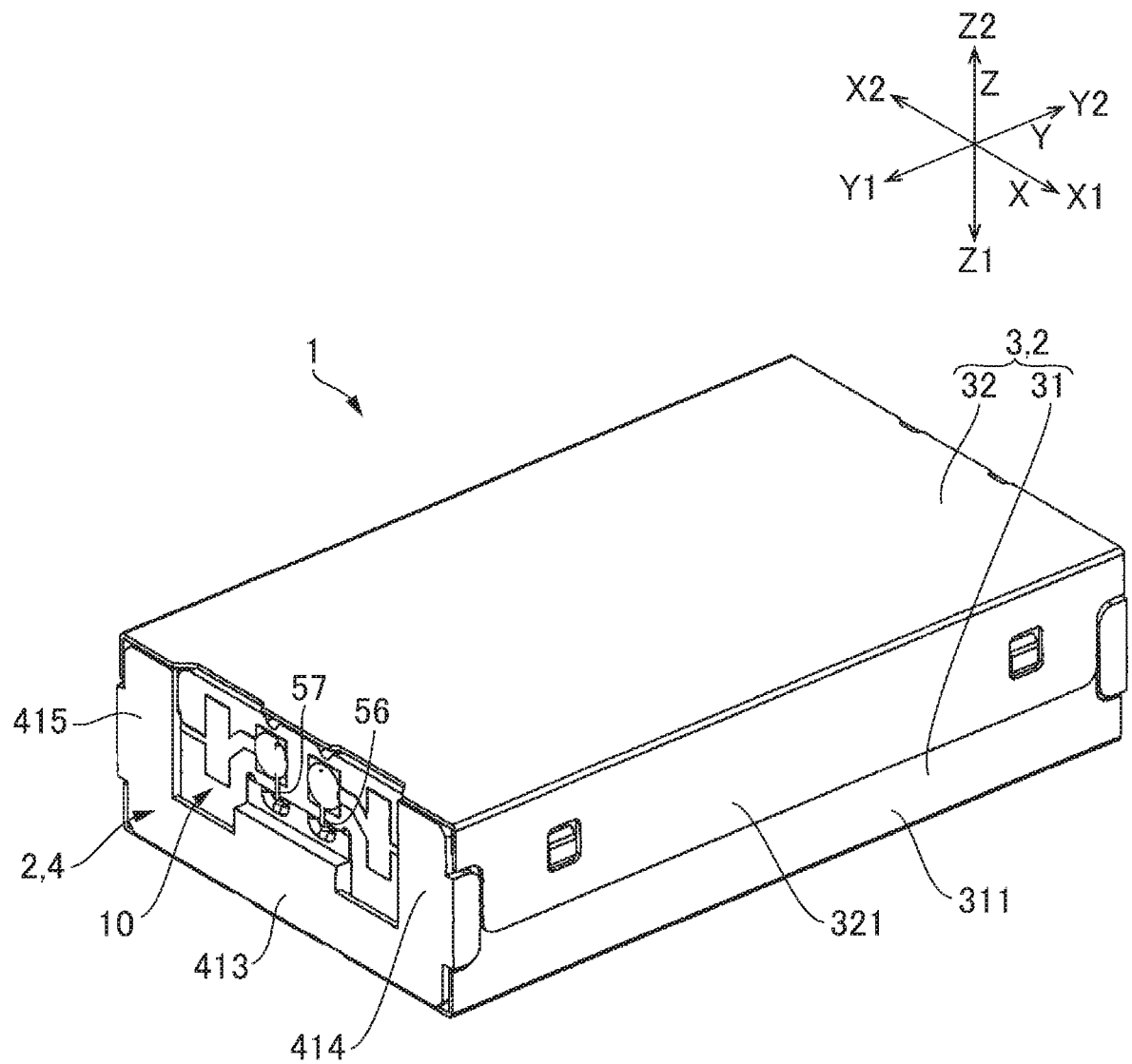
FIG. 1 is a perspective view showing an actuator in accordance with at least an embodiment of the present disclosure.
Figure 2:
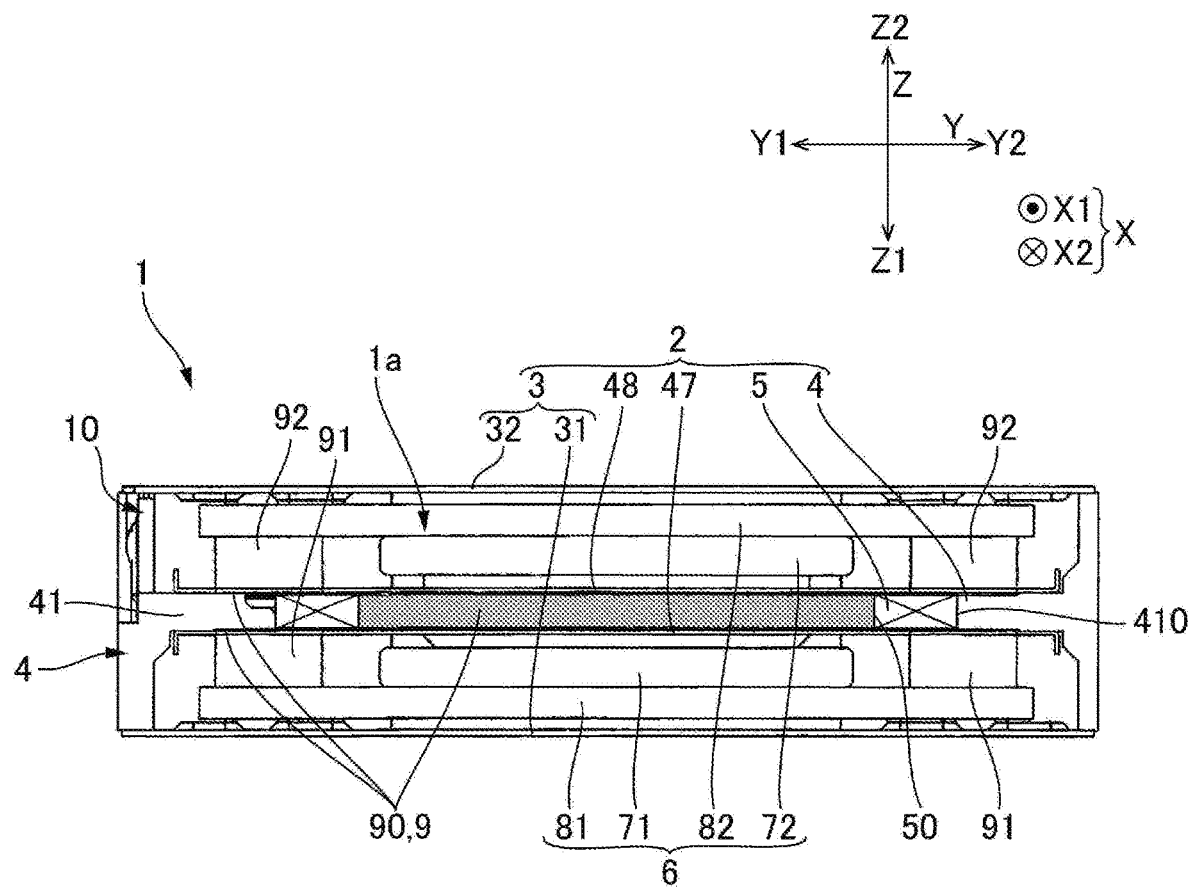
FIG. 2 is a "Y-Z" cross-sectional view showing the actuator in FIG. 1.
Figure 3:
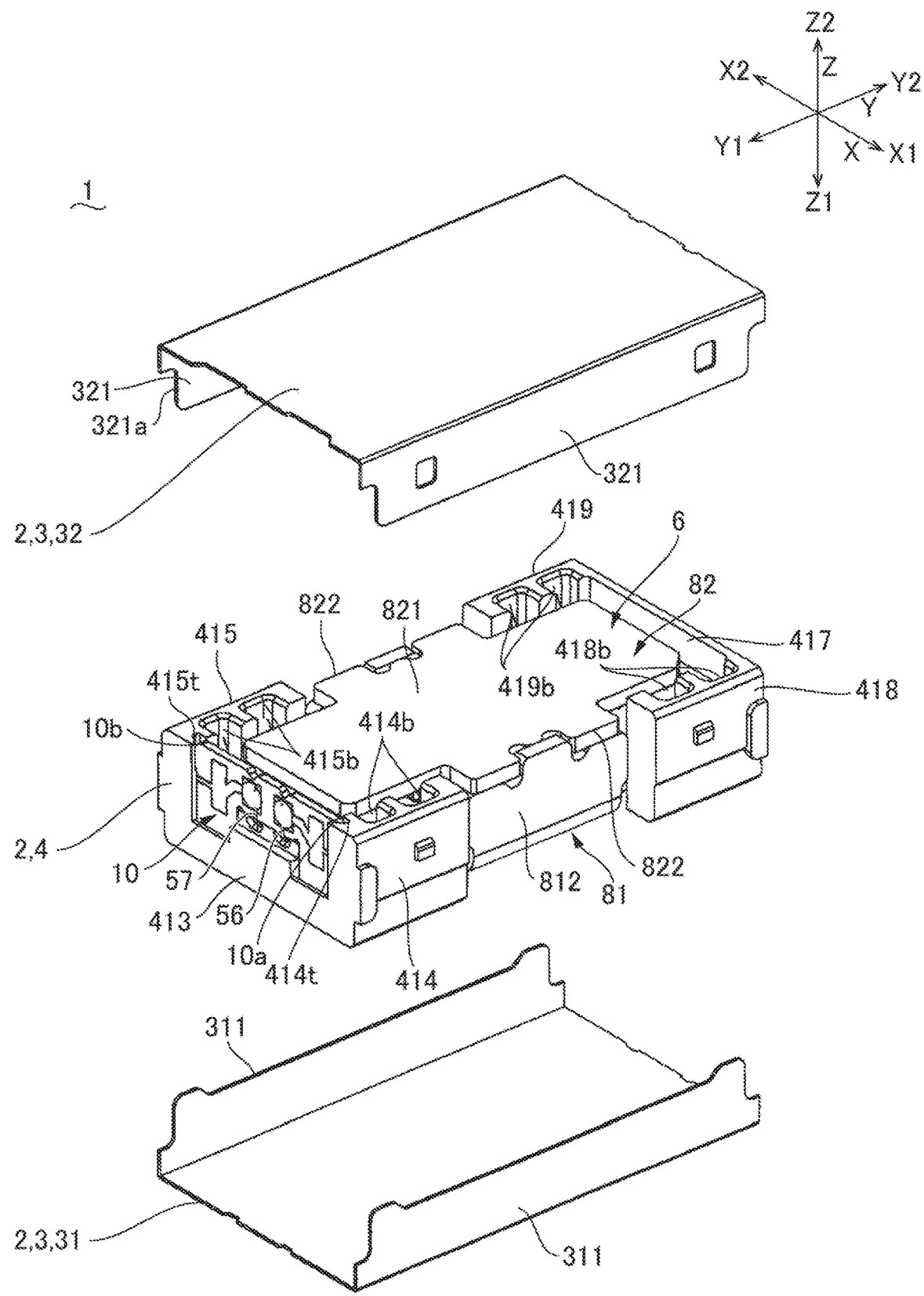
FIG. 3 is an exploded perspective view showing the actuator in FIG. 1.
Figure 4:
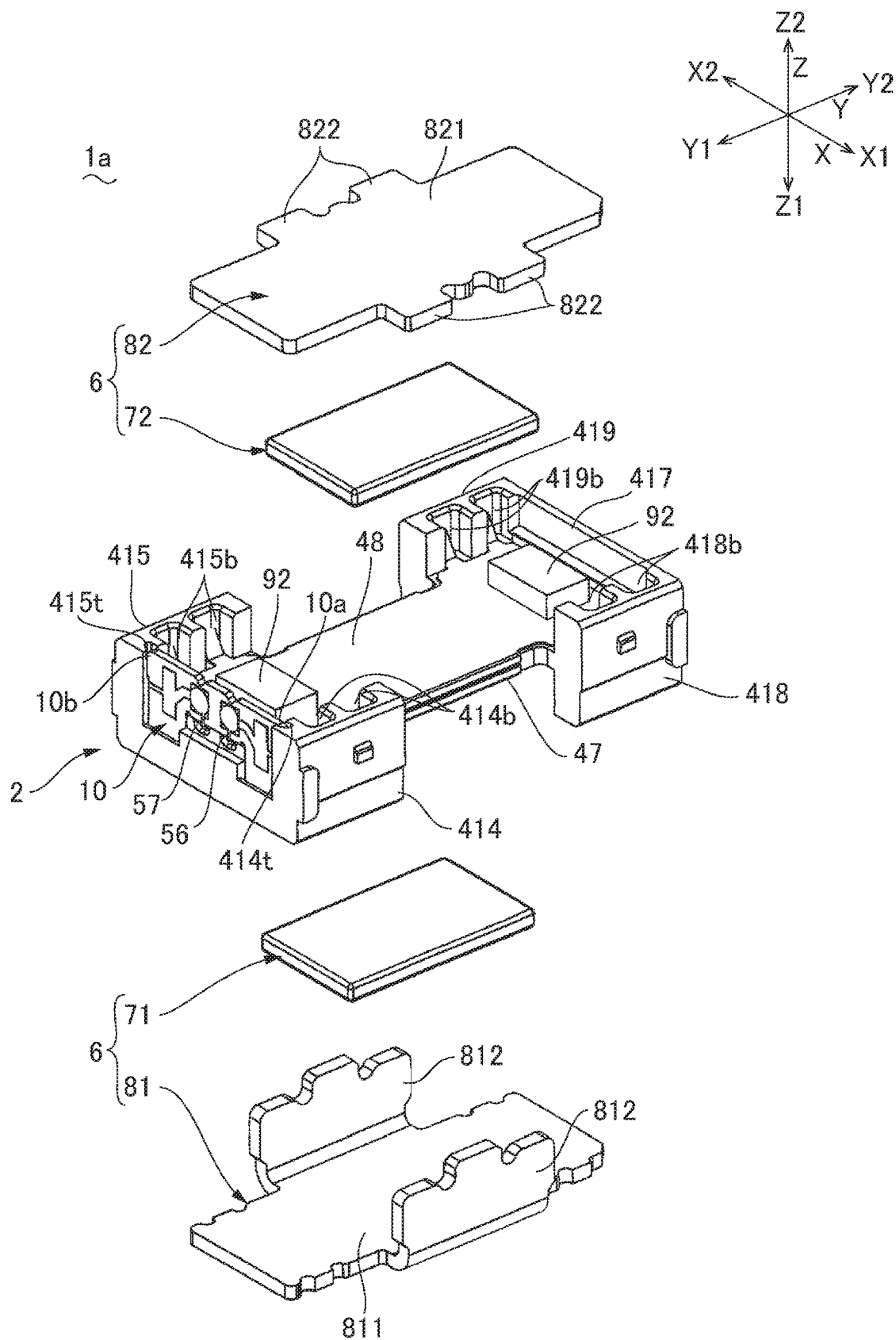
FIG. 4 is an exploded perspective view showing the actuator in FIG. 1 which is disassembled into a support body and a movable body.
Figure 5:
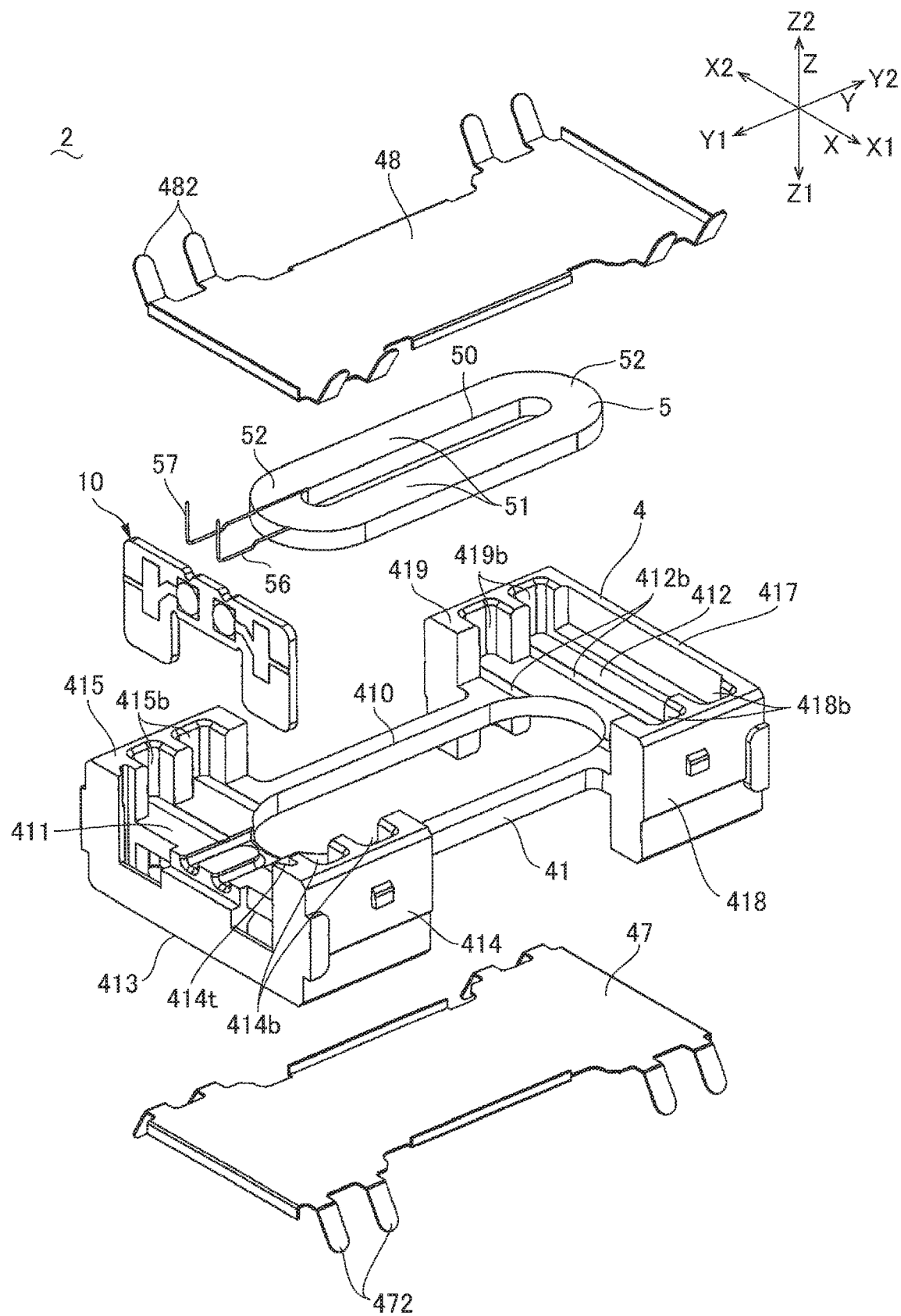
FIG. 5 is an exploded perspective view showing the support body in FIG. 4 which is viewed from the other side in a first direction.

FIG. 1 is a perspective view showing an actuator 1 in accordance with at least an embodiment of the present disclosure. FIG. 2 is a "Y-Z" cross-sectional view showing the actuator 1 in FIG. 1. FIG. 3 is an exploded perspective view showing the actuator 1 in FIG. 1. FIG. 4 is an exploded perspective view showing the actuator 1 in FIG. 1 which is disassembled into a support body 2 and a movable body 6. FIG. 5 is an exploded perspective view showing the support body 2 in FIG. 4 which is viewed from the other side "Z2" in the first direction "Z".

An actuator 1 shown in FIG. 1 notifies information by vibration in the second direction "X" to a user who holds the actuator 1 in his/her hand. Therefore, the actuator 1 can be utilized as an operation member of a game machine or the like and functions as a tactile device (a haptic device) which is capable of realizing a new feeling by vibration and the like.

As shown in FIGS. 2 through 5, the actuator 1 includes a support body 2 including a case 3 in a rectangular shape which defines an outer shape of the actuator 1 and the like, and a movable body 6 which is supported in an inside of the case 3 so as to be movable in the second direction "X" with respect to the support body 2. Information is outputted by vibration in the second direction "X" of the movable body 6.

The support body 2 includes the case 3, a coil holder 4, a coil 5 and a power feeding substrate 10, and the movable body 6 includes a permanent magnet (first permanent magnet 71 and second permanent magnet 72) and a yoke (first yoke 81 and second yoke 82). The coil 5 and the permanent magnet (first permanent magnet 71 and second permanent magnet 72) structure a magnetic drive circuit 1a which relatively moves the movable body 6 with respect to the support body 2. The movable body 6 is supported by the support body 2 through viscoelastic members 91 and 92 provided between the movable body 6 and the support body 2.

(Structure of Movable Body 6)

As shown in FIGS. 2 through 4, the movable body 6 includes a first yoke 81 disposed on one side "Z1" in the first direction "Z" with respect to the coil 5, and a first permanent magnet 71 in a flat plate shape which is held by a face of the first yoke 81 on the other side "Z2" in the first direction "Z" so as to face the coil 5 on one side "Z1" in the first direction "Z". Further, the movable body 6 includes a second yoke 82 disposed on the other side "Z2" in the first direction "Z" with respect to the coil 5, and a second permanent magnet 72 in a flat plate shape which is held by a face of the second yoke 82 on one side "Z1" in the first direction "Z" so as to face the coil 5 on the other side "Z2" in the first direction "Z". In this embodiment, the movable body 6 is structured of the first yoke 81, the first permanent magnet 71, the second yoke 82 and the second permanent magnet 72.

The first yoke 81 is provided with a flat plate part 811 to which the first permanent magnet 71 is fixed and a pair of connecting parts 812 which are bent from end parts of the flat plate part 811 on both sides in the second direction "X" to the other side "Z2" in the first direction "Z". The second yoke 82 is provided with a flat plate part 821 to which the second permanent magnet 72 is fixed, and an intermediate portion in the third direction "Y" of the flat plate part 821 is provided with a pair of projecting parts 822 which are projected to one side "X1" and the other side "X2" in the second direction "X". In this embodiment, a pair of the projecting parts 822 is connected with the tip end parts of a pair of the connecting parts 812 of the first yoke 81 by a method such as welding. Each of the first permanent magnet 71 and the second permanent magnet 72 is magnetized so that a magnetic pole on one side "Z1" in the first direction "Z" is different from a magnetic pole on the other side "Z2" in the first direction "Z".

(Structure of Support Body 2)

As shown in FIGS. 1 and 2, the case 3 of the support body 2 includes a first case member 31 located on one side "Z1" in the first direction "Z" and a second case member 32 which is overlapped with the first case member 31 on the other side "Z2" in the first direction "Z". A pair of side plate parts 311 of the first case member 31 provided on both sides in the second direction "X" are respectively connected with a pair of side plate parts 321 of the second case member 32 provided on both sides in the second direction "X", and thereby the case 3 is structured. In this case, the coil holder 4, the coil 5 and the movable body 6 shown in FIGS. 2 and 5 are accommodated between the first case member 31 and the second case member 32.

As shown in FIG. 5, the coil 5 is an air core coil formed in a ring-shaped planar shape which is wound in an elliptical shape and is held by the coil holder 4. The coil 5 is provided with two long side parts 51, which are arranged in parallel in the second direction "X" and are extended in the third direction "Y", and two short side parts 52 in a circular arc shape which are connected with both ends in the third direction "Y" of the two long side parts 51. The long side parts 51 of the coil 5 structured as described above face the first permanent magnet 71 on one side "Z1" in the first direction "Z" and face the second permanent magnet 72 on the other side "Z2" in the first direction "Z". The coil holder 4 is provided with a plate part 41 in which a coil arrangement hole 410 comprised of an elliptical-shaped through hole where the coil 5 is disposed on an inner side is opened in the first direction "Z".

In an end part 411 of the plate part 41 on one side "Y1" in the third direction "Y", a side plate part 413 is protruded from an edge on one side "Y1" in the third direction "Y" toward one side "Z1" in the first direction "Z", and side plate parts 414 and 415 are protruded from an edge on one side "X1" in the second direction "X" and from an edge on the other side "X2" in the second direction "X" toward one side "Z1" in the first direction "Z" and toward the other side "Z2" in the first direction "Z". Groove-shaped recessed parts 414b and 415b extended in the first direction "Z" are formed on inner faces of the side plate parts 414 and 415 on the other side "Z2" in the first direction "Z" with respect to the plate part 41. Further, similar groove-shaped recessed parts (not shown) are also formed on inner faces of the side plate parts 414 and 415 on one side "Z1" in the first direction "Z" with respect to the plate part 41.

In an end part 412 of the plate part 41 on the other side "Y2" in the third direction "Y", side plate parts 417, 418 and 419 are protruded toward one side "Z1" and the other side "Z2" in the first direction "Z" from an edge on the other side "Y2" in the third direction "Y", from an edge on one side "X1" in the second direction "X", and from an edge on the other side "X2" in the second direction "X". Groove-shaped recessed parts 418b and 419b extended in the first direction "Z" are formed on inner faces of the side plate parts 418 and 419 on the other side "Z2" in the first direction "Z" with respect to the plate part 41. Further, similar groove-shaped recessed parts (not shown) are also formed on inner faces of the side plate parts 418 and 419 on one side "Z1" in the first direction "Z" with respect to the plate part 41.

The side plate parts 414 and 415 are formed with slits 414t and 415t. End parts 10a and 10b on both sides of the power feeding substrate 10 are held by the slits 414t and 415t. End parts 56 and 57 of a coil wire structuring the coil 5 are connected with the power feeding substrate 10 by soldering or the like.

(Structure of First Plate 47 and Second Plate 48)

As shown in FIGS. 2, 4 and 5, the support body 2 includes a first plate 47 which is overlapped with the coil arrangement hole 410 and the plate part 41 from one side "Z1" in the first direction "Z", and the coil 5 is fixed to the first plate 47 and the plate part 41 by an adhesive layer 9 made of an adhesive 90 filled in at least an air core part 50 of the coil 5. Therefore, the coil 5 faces the first permanent magnet 71 through the first plate 47 in the first direction "Z". Further, the first plate 47 is fixed to the plate part 41 by the adhesive layer 9.

Further, the support body 2 includes a second plate 48 which is overlapped with the coil arrangement hole 410 and the plate part 41 from the other side "Z2" in the first direction "Z", and the coil 5 is fixed to the second plate 48 by the adhesive layer 9 made of the adhesive 90 filled in at least the air core part 50 of the coil 5. Therefore, the coil 5 faces the second permanent magnet 71 through the second plate 48 in the first direction "Z". Further, the second plate 48 is fixed to the plate part 41 by the adhesive layer 9.

The first plate 47 and the second plate 48 are made of nonmagnetic material. In this embodiment, the first plate 47 and the second plate 48 are made of a metal plate. More specifically, the first plate 47 and the second plate 48 are made of a nonmagnetic stainless steel plate.

The first plate 47 is provided with nail-shaped protruded parts 472 which are obliquely protruded from both sides in the second direction "X" to one side "Z1" in the first direction "Z". The protruded part 472 is elastically abutted with an inner side of the groove-shaped recessed part (not shown) formed in each of the side plate parts 414, 415, 418 and 419 and thereby the first plate 47 is held by the coil holder 4. The second plate 48 is provided with nail-shaped protruded parts 482 which are obliquely protruded from both sides in the second direction "X" to the other side "Z2" in the first direction "Z". The protruded part 482 is elastically abutted with an inner side of each of the groove-shaped recessed parts 414b, 415b, 418b and 419b formed in the side plate parts 414, 415, 418 and 419 and thereby the second plate 48 is held by the coil holder 4.

As described above, in the actuator 1 in this embodiment, the coil 5 is disposed on an inner side of the coil arrangement hole 410 penetrating through the plate part 41 of the coil holder 4 in the first direction "Z", and the first plate 47 is disposed so as to overlap with the coil arrangement hole 410 and the plate part 41 from one side "Z1" in the first direction "Z". Therefore, when the air core part 50 of the coil 5 is filled with the adhesive 90, the adhesive 90 is flowed into between the coil 5 and the coil holder 4, between the coil 5 and the first plate 47, and between the first plate 47 and the coil holder 4. Accordingly, when the adhesive 90 is cured or hardened, the coil 5, the first plate 47 and the coil holder 4 are fixed to each other by the adhesive layer 9. Therefore, different from a case that an adhesive is flowed into a gap space between an outer peripheral face of the coil 5 and an inner peripheral face of the coil arrangement hole 410, the coil 5 disposed in the coil arrangement hole 410 of the coil holder 4 can be adhesively bonded to the coil holder 4 appropriately. Further, the first plate 47 is disposed between the first permanent magnet 71 and the coil 5. Therefore, even in a case that the movable body 6 is moved to one side "Z1" in the first direction "Z", the first permanent magnet 71 and the coil 5 are not directly contacted with each other and thus the coil 5 is hard to be damaged. Further, the second plate 48 is disposed between the second permanent magnet 72 and the coil 5. Therefore, even in a case that the movable body 6 is moved to the other side "Z2" in the first direction "Z", the second permanent magnet 72 and the coil 5 are not directly contacted with each other and thus the coil 5 is hard to be damaged. Further, the first plate 47 and the second plate 48 are made of a metal plate and thus heat generated by the coil 5 can be efficiently dissipated through the first plate 47 and the second plate 48.

(Structure of Viscoelastic Members 91 and 92)

As shown in FIGS. 2 through 5, the movable body 6 is supported so as to be movable in the second direction "X" and the third direction "Y" only by the viscoelastic members 91 and 92 provided between the movable body 6 and the support body 2. Therefore, in this embodiment, a plate spring or the like for movably supporting the movable body 6 in the second direction "X" and the third direction "Y" is not disposed between the movable body 6 and the support body 2. Accordingly, a resonance frequency of the movable body 6 with respect to the support body 2 is regulated by the viscoelastic members 91 and 92.

The viscoelastic member 91 is provided in a portion where the first yoke 81 and the first plate 47 are faced each other in the first direction "Z". The viscoelastic member 92 is provided in a portion where the second yoke 82 and the second plate 48 are faced each other in the first direction "Z". More specifically, the viscoelastic member 91 is provided in a portion where the first yoke 81 and the first plate 47 are faced each other in the first direction "Z" at each of two positions separated in the third direction "Y" (each of the short side part 52 side of the coil 5). The viscoelastic member 92 is provided in a portion where the second yoke 82 and the second plate 48 are faced each other in the first direction "Z" at each of two positions separated in the third direction "Y" (each of the short side part 52 side of the coil 5). Therefore, the movable body 6 can be movably supported in the second direction "X" without using a plate-shaped spring or the like.

In this embodiment, the viscoelastic members 91 and 92 are made of a gel-state member such as silicone gel. In this embodiment, the viscoelastic members 91 and 92 are made of silicone gel having a penetration degree in a range of 90 degrees to 110 degrees. The penetration degree is, as defined in JIS-K-2207 and JIS-K-2220, a value expressed in units of 1/10 mm of an entering depth of a needle of a 1/4 cone when a total load of 9.38 g is applied to the needle of the 1/4 cone for five seconds at 25° C. The penetration degree means that the silicone gel is harder as the value is smaller.

As described above, in the actuator 1 in this embodiment, the viscoelastic members 91 and 92 are provided between the movable body 6 and the support body 2 and thus resonance of the movable body 6 can be suppressed. In this embodiment, the viscoelastic member 91 is provided between the first plate 47 and the first yoke 81, and the viscoelastic member 92 is provided between the second plate 48 and the second yoke 82. Therefore, the case 3 is not utilized for providing the viscoelastic members 91 and 92. Accordingly, the viscoelastic members 91 and 92 can be provided between the support body 2 and the movable body 6 without utilizing the case 3. As a result, the viscoelastic members 91 and 92 can be provided in a middle stage of assembling when the case 3 is not provided and thus, vibration characteristics including a damper characteristic can be measured in the middle of the manufacturing process. Further, since the case 3 is not used for providing the viscoelastic members 91 and 92, the viscoelastic members 91 and 92 can be provided in an actuator which does not have a case 3.

Further, the viscoelastic members 91 and 92 are provided in the support body 2 and the movable body 6 at positions facing in the first direction "Z" intersecting the second direction "X" (vibration direction) and thus, when the movable body 6 is vibrated in the second direction "X", the viscoelastic members 91 and 92 are deformed in the shearing direction to prevent resonance. Therefore, even when the movable body 6 is vibrated in the second direction "X", a change of an elastic modulus of each of the viscoelastic members 91 and 92 is small and thus resonance of the movable body 6 can be effectively suppressed. In other words, each of the viscoelastic members 91 and 92 is a viscoelastic member which is provided with linear or non-linear expansion and contraction characteristics according to the expansion and contraction direction. For example, the viscoelastic members 91 and 92 are provided with an expansion and contraction characteristic in which, when they are pressed in its thickness direction (axial direction) to be compressed and deformed, a non-linear component (spring coefficient) is larger than a linear component. On the other hand, when pulled and extended in the thickness direction (axial direction), the viscoelastic members 91 and 92 are provided with an expansion and contraction characteristic in which a linear component (spring coefficient) is larger than a non-linear component (spring coefficient). Further, in a case that the viscoelastic members 91 and 92 are deformed in a direction (shearing direction) intersecting the thickness direction (axial direction), even when they are moved in either direction, the viscoelastic members 91 and 92 are deformed in a pulled and extended direction and thus, the viscoelastic members 91 and 92 are provided with a deformation characteristic in which a linear component (spring coefficient) is larger than a non-linear component (spring coefficient). In this embodiment, the viscoelastic members 91 and 92 are structured so as to deform in a shearing direction when the movable body 6 is vibrated in the second direction "X". Therefore, when the movable body 6 is vibrated in the second direction "X", spring forces in the moving direction of the viscoelastic members 91 and 92 become constant. Accordingly, reproducibility of vibrational acceleration with respect to an input signal can be improved by using spring elements in the shearing direction of the viscoelastic members 91 and 92 and thus, vibration with a delicate nuance can be realized.

Further, both faces in the first direction "Z" of each of the viscoelastic members 91 and 92 are, as described below with reference to FIG. 6, fixed to the movable body 6 and the support body 2 by the adhesive layer. Therefore, the viscoelastic members 91 and 92 surely follow a movement of the movable body 6 and thus, resonance of the movable body 6 can be prevented effectively.

Further, the viscoelastic members 91 and 92 are set in a state that they are compressed between the support body 2 and the movable body 6 in the first direction "Z". Therefore, the viscoelastic members 91 and 92 surely follow a movement of the movable body 6 and thus, resonance of the movable body 6 can be prevented effectively.

(Operation)

In the actuator 1 in this embodiment, when electrical power is supplied from the outside (host apparatus) to the coil 5 through the power feeding substrate 10, the movable body 6 is reciprocated in the second direction "X" by the magnetic drive circuit 1a provided with the coil 5, the first permanent magnet 71 and the second permanent magnet 72. Therefore, a user who holds the actuator 1 by hand can obtain information by the vibration of the actuator 1. In this case, a frequency of a signal wave which is applied to the coil 5 is varied, for example, according to information to be transmitted. Further, in a case that the polarity of the signal wave which is applied to the coil 5 is reversed, the voltage is changed slowly or quickly between a time when the polarity of the drive signal is in a negative period and a time when the polarity of the drive signal is in a positive period. As a result, a difference is generated between an acceleration when the movable body 6 is moved to one side "X1" in the second direction "X" and an acceleration when the movable body 6 is moved to the other side "X2" in the second direction "X". Therefore, the user can obtain a feeling such that the actuator 1 is moved to one side "X1" or to the other side "X2" in the second direction "X".

(Fixing Structure of Viscoelastic Members 91 and 92)

Figure 6:
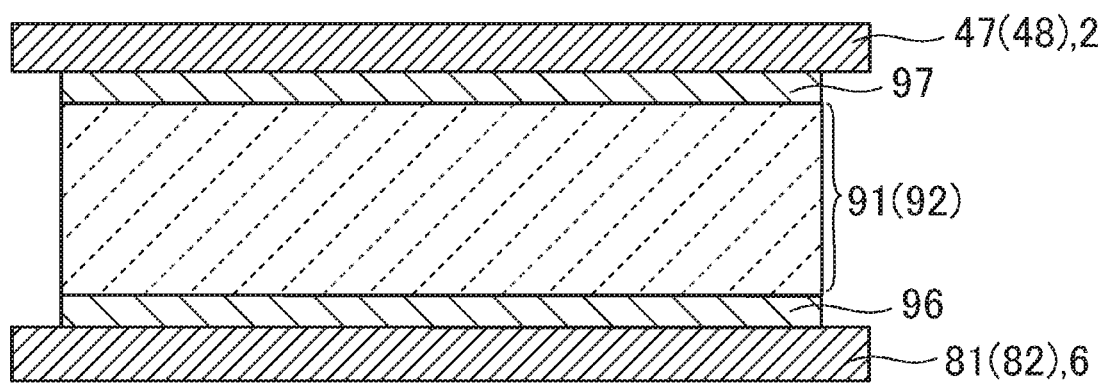
FIG. 6 is an explanatory view schematically showing a fixing structure of a viscoelastic member shown in FIG. 2.

FIG. 6 is an explanatory view schematically showing a fixing structure of the viscoelastic members 91 and 92 shown in FIG. 2. As shown in FIG. 6, in the actuator 1 in this embodiment, the viscoelastic member 91 is adhesively bonded to one side member of a member structuring the support body 2 and a member structuring the movable body 6 by the first adhesive layer 96. Further, the viscoelastic member 91 is adhesively bonded to the other side member of the member structuring the support body 2 and the member structuring the movable body 6 by the second adhesive layer 97.

In this embodiment, the viscoelastic member 91 is adhesively bonded to the first yoke 81 (one side member) of the movable body 6 by the first adhesive layer 96 and is fixed to the first plate 47 (the other side member) of the support body 2 by the second adhesive layer 97. Further, as shown by the reference signs with parentheses, the viscoelastic member 92 is adhesively bonded to the second yoke 82 of the movable body 6 by the first adhesive layer 96 and is fixed to the second plate 48 of the support body 2 by the second adhesive layer 97.

(Manufacturing Method of Actuator 1)

Figure 7:
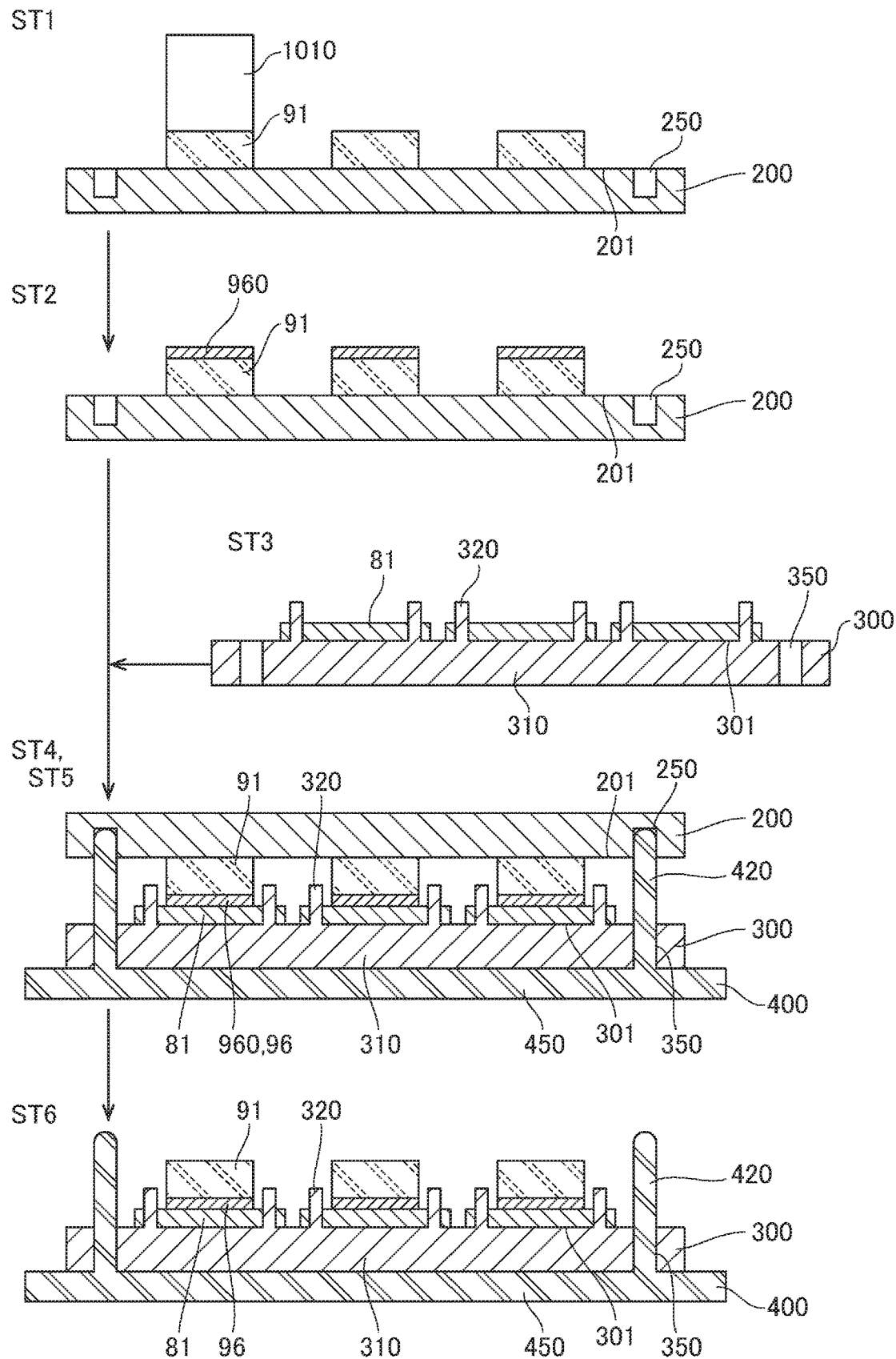
FIG. 7 is a cross-sectional view showing steps in a manufacturing method of the actuator shown in FIG. 1.

FIG. 7 is a cross-sectional view showing steps in a manufacturing method of the actuator 1 shown in FIG. 1. In FIG. 7, scales of respective members are changed so as to be easily recognized. In the manufacturing steps of the actuator 1 in this embodiment, the steps shown in FIG. 7 are performed for adhesively bonding the viscoelastic member 91 to the first yoke 81 (one side member) of the movable body 6 by the first adhesive layer 96.

First, in the step "ST1" (first step) shown in FIG. 7, a viscoelastic member 91 is disposed on one face 201 side of a first jig 200. In this embodiment, a plurality of viscoelastic members 91 is disposed at predetermined positions of the first jig 200. In this embodiment, after viscoelastic members 91 have been disposed on one face 201 of the first jig 200 by a conveyance head 1010, the conveyance head 1010 is separated from the viscoelastic members 91.

Next, in the step "ST2", an adhesive 960 is applied to faces of the viscoelastic members 91 on an opposite side to the first jig 200.

On the other hand, in the step "ST3", a first yoke 81 (one side member) is previously disposed on one face 301 of a second jig 300. In this embodiment, the second jig 300 is provided with a plate part 310 on which the first yoke 81 is placed and protruded parts 320 which are protruded from the plate part 310 to position the first yoke 81. In this embodiment, a plurality of the first yokes 81 is disposed at predetermined positions of the second jig 300.

Next, in the step "ST4" (second step), the first jig 200 and the second jig 300 are overlapped with each other so that the viscoelastic member 91 and the first yoke 81 are overlapped with each other through the adhesive 960. In this embodiment, the first jig 200 and the second jig 300 are overlapped so that a plurality of the viscoelastic members 91 and a plurality of the first yokes 81 are overlapped with each other through the adhesive 960.

In this case, the one face 301 of the second jig 300 is set to face upward and the one face 201 of the first jig 200 is set to face downward and, in this manner, the first jig 200 and the second jig 300 are overlapped with each other. Therefore, the second jig 300 is required to perform only positioning of the first yoke 81 and is not required to hold the first yoke 81. Further, in the first jig 200, the viscoelastic member 91 is adhered to the first jig 200 by its own adhesive force and thus, even when the one face 201 of the first jig 200 is set to face downward, the viscoelastic member 91 is hard to be fallen from the first jig 200.

In this embodiment, when the first jig 200 and the second jig 300 are to be overlapped with each other, a third jig 400 for positioning is used. The third jig 400 is provided with a plate part 450 which supports the first jig 200 and a plurality of protruded parts 420 for positioning. The protruded part 420 is penetrated through a through hole 350 of the second jig 300 and is fitted to a positioning hole 250 of the first jig 200 and thereby the first jig 200 and the second jig 300 are positioned.

Next, in the step "ST5" (third step), the adhesive 960 is hardened, and the first yoke 81 and the viscoelastic member 91 are adhesively bonded to each other by the first adhesive layer 96. In this embodiment, although the adhesive 960 is a room temperature hardening type adhesive, the adhesive 960 is heated to promote hardening.

After that, in the step "ST6" (fourth step), the first jig 200 is separated from the viscoelastic member 91. Further, although not shown, the first yoke 81 to which the viscoelastic member 91 is bonded is collected from the second jig 300.

Also in a case that the viscoelastic member 92 is to be adhesively bonded to the second yoke 82 by the first adhesive layer 96, the steps described with reference to FIG. 7 are performed.

(Principal Effects in this Embodiment)

As described above, in the manufacturing method in this embodiment, when the viscoelastic member 91 is disposed on one face 201 of the first jig 200 in the first step (step "ST1"), the viscoelastic member 91 is adhered to the first jig 200 by its own adhesive force. Therefore, the conveyance head 1010 used to convey the viscoelastic member 91 can be easily separated from the viscoelastic member 91.

Further, after the viscoelastic member 91 and the first yoke 81 have been overlapped with each other through the adhesive 960 in the second step (step "ST4"), when the adhesive 960 is hardened and the viscoelastic member 91 is adhesively bonded to the first yoke 81 in the third step (step "ST5"), in a case that the first jig 200 is to be separated from the viscoelastic member 91 in the fourth step (step "ST6"), a situation is not occurred that the viscoelastic member 91 is moved while the viscoelastic member 91 is adhered to the first jig 200. Therefore, the viscoelastic member 91 can be adhesively bonded to the first yoke 81 efficiently.

As described above, after the first yoke 81 and the viscoelastic member 91 have been adhesively bonded to each other by the first adhesive layer 96, as shown in FIG. 6, the first plate 47 (the other side member) of the support body 2 and the viscoelastic member 91 are fixed to each other by the second adhesive layer 97. In this case, the conveyance head or the like is not required to touch the viscoelastic member 91 and thus, the first plate 47 and the viscoelastic member 91 can be adhesively bonded efficiently.

In this embodiment, the adhesive 960 is applied to the viscoelastic member 91. However, the adhesive 960 may be applied to the first yoke 81.

(Structural Example of Conveyance Head 1010)

Figure 8:
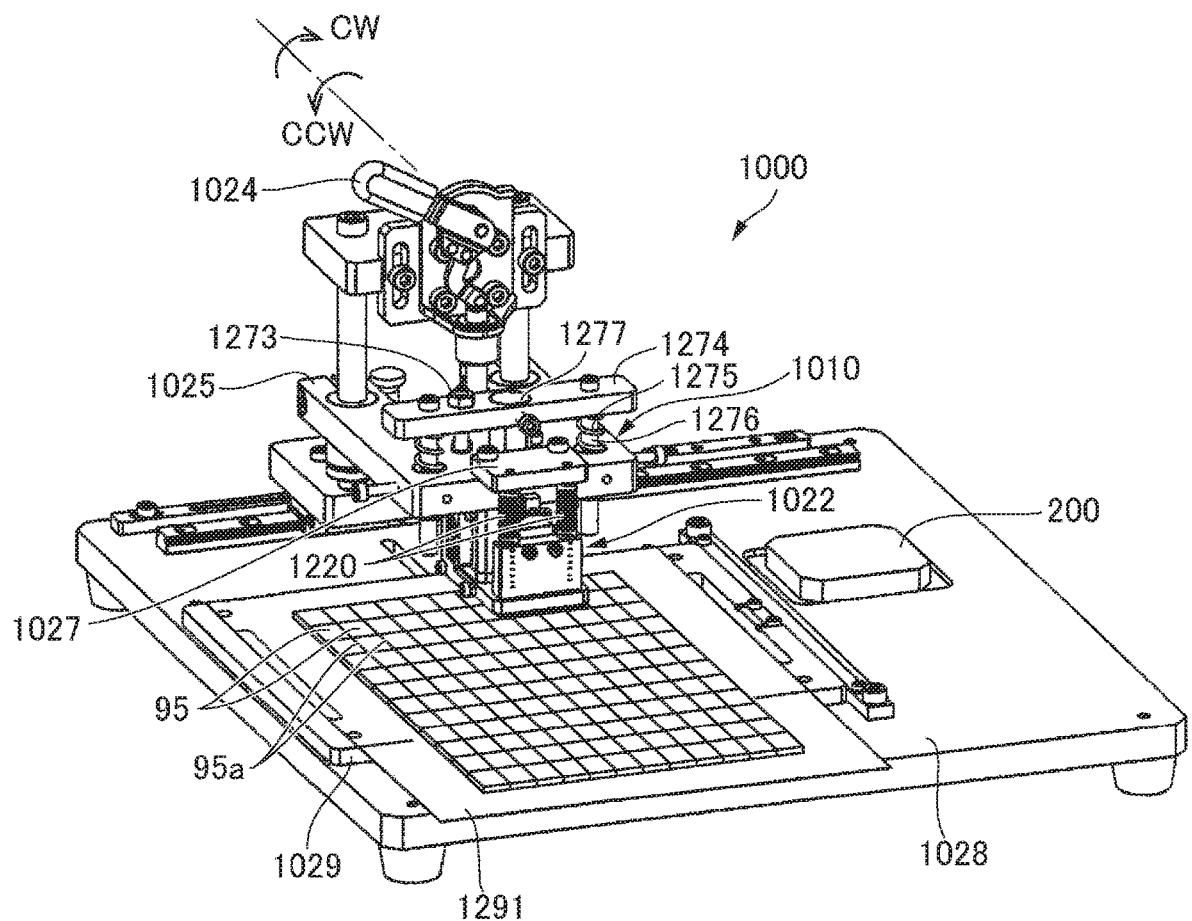
FIG. 8 is an explanatory view showing a conveyance device including a conveyance head shown in FIG. 7.
Figure 9:
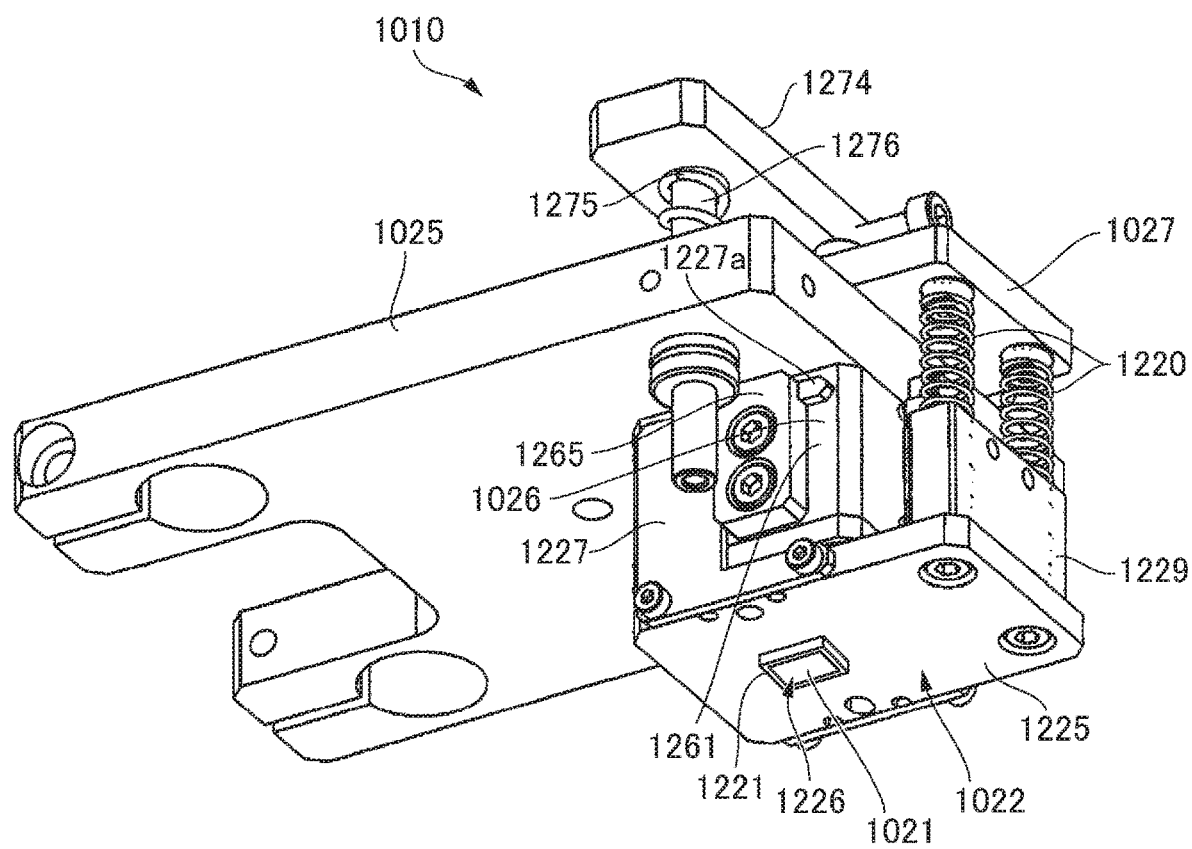
FIG. 9 is an explanatory view showing the conveyance head in FIG. 8.

FIG. 8 is an explanatory view showing a conveyance device 1000 including the conveyance head 1010 shown in FIG. 7. FIG. 9 is an explanatory view showing the conveyance head 1010 in FIG. 8. FIGS. 10A through 10D are explanatory views showing a conveyance operation for a viscoelastic member by the conveyance device 1000 shown in FIG. 8. In FIG. 8 and FIGS. 10A through 10D, the viscoelastic members 91 and 92 shown in FIG. 2 are collectively shown as a viscoelastic member 95.

A conveyance device 1000 shown in FIG. 8 is a conveyance device for a viscoelastic member 95 and includes a placing table 1029 on which a plurality of viscoelastic members 95 is placed and a conveyance head 1010 structured to relatively movable in an upper and lower direction with respect to the placing table 1029. A plurality of the viscoelastic members 95 is structured so that a sheet-shaped viscoelastic member is cut in a right and left direction and in a front and rear direction, and the viscoelastic members 95 are arranged on the placing table 1029 so that their side faces 95a are contacted with each other in the right and left direction and the front and rear direction. In this embodiment, a release paper 1291 is disposed on an upper face of the placing table 1029 and a plurality of the viscoelastic members 95 is disposed on the release paper 1291. The conveyance head 1010 is movable in the right and left direction, and the placing table 1029 is movable in the front and rear direction on a base 1028. Therefore, when the conveyance head 1010 and the placing table 1029 are moved, a plurality of the viscoelastic members 95 can be sequentially lifted and conveyed to the first jig 200.

As shown in FIG. 9, the conveyance head 1010 generally includes a block 1026 which is fixed to an under face of a support plate 1025, a suction part 1021 provided so as to protrude from an under face of the block 1026, and an abutting member 1022 structured to movable in the upper and lower direction with respect to the block 1026.

The abutting member 1022 includes a bottom plate part 1225 which is overlapped with an under face of the block 1026 and side plate parts 1227 which are respectively extended from the bottom plate part 1225 to an upper side along two side faces 1261 of the block 1026. The abutting member 1022 is guided by the side faces 1261 of the block 1026 and is movable in the upper and lower direction. An urging member 1220 comprised of two coiled springs is disposed on a side of the support plate 1025 between a receiving plate 1027 fixed to the support plate 1025 and a side plate part 1229 of the abutting member 1022. The urging member 1220 urges the abutting member 1022 to a lower side. A side face 1261 of the block 1026 is fixed with a plate-shaped stopper 1265, and a moving range to a lower side of the abutting member 1022 on the conveyance head 1010 is restricted by abutting a tip end part 1227a of the side plate part 1227 with the stopper 1265.

An opening part 1226 is formed at a position overlapping with the suction part 1021 in the bottom plate part 1225 of the abutting member 1022, and a frame-shaped abutting part 1221 is protruded to a lower side from a periphery of the opening part 1226. Therefore, the suction part 1021 is set in an opened state toward a lower side in the opening part 1226, and the abutting part 1221 is formed so as to surround the periphery of the suction part 1021.

Figure 10A:
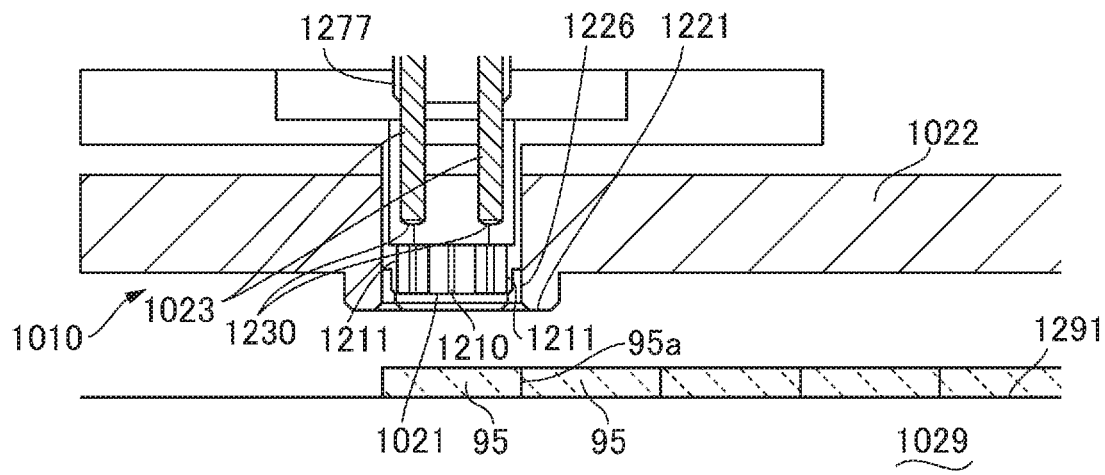
FIGS. 10A through 10D are explanatory views showing a conveyance operation for a viscoelastic member by the conveyance device shown in FIG. 8.

As shown in FIG. 10A, the suction part 1021 is formed with a plurality of vent holes 1210 for performing vacuum suction. Further, two holes 1211 are opened in the suction part 1021, and a bar-shaped member 1023 is disposed so as to be movable in the upper and lower direction on an inner side of each of the two holes 1211. In this embodiment, the bar-shaped member 1023 is formed at a lower end part of a shaft 1277 shown in FIG. 8, and an upper end side of the shaft 1277 is connected with a stopper 1274 whose movement to an upper side is limited by a bolt 1273. Further, a coiled spring 1275 is disposed around a shaft 1276 extended to a lower side from the stopper 1274 between the stopper 1274 and the conveyance head 1010. Therefore, the bar-shaped member 1023 is relatively movable with respect to the abutting part 1221 between an upper side position retreated to an upper side with respect to the abutting part 1221 and a lower side position protruded to a lower side from the abutting part 1221 accompanied with movement in the upper and lower direction of the conveyance head 1010.

(Conveyance Operation)

In this embodiment, a plurality of the viscoelastic members 95 is conveyed one by one by the conveyance head 1010. Therefore, as shown in FIG. 10A, the opening part 1226 surrounded by the abutting part 1221 has a size of one viscoelastic member 95. In a standby state shown in FIG. 10A, the conveyance head 1010 is located at a standby position separated on an upper side from the viscoelastic member 95. In this state, the opening part 1226 is located at a position directly above one viscoelastic member 95 which is going to be conveyed among a plurality of the viscoelastic members 95. Further, air is absorbed through the vent holes 1210 in the absorption part 1021.

Figure 10B:
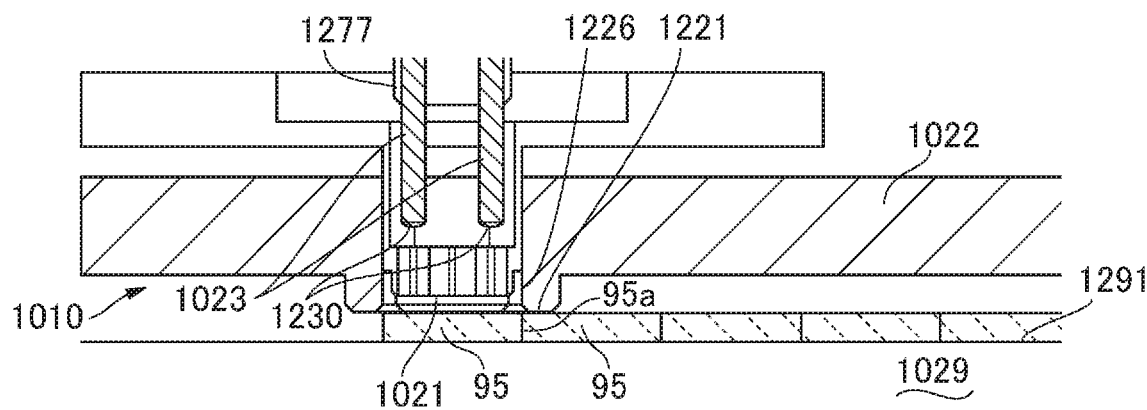

From this state, when a lever 1024 shown in FIG. 8 is turned in a counterclockwise direction "CCW" from a neutral position in a clockwise direction "CW", as shown in FIG. 10B, the conveyance head 1010 is lowered and, first, the abutting part 1221 of the abutting member 1022 is abutted with adjacent viscoelastic members 95 located around one desired viscoelastic member 95 from the upper side "Z2". In addition, when the lever 1024 shown in FIG. 8 is turned in the counterclockwise direction "CCW", the conveyance head 1010 is further lowered and the desired viscoelastic member 95 is fitted to an inner side of the abutting part 1221 and, as a result, the desired viscoelastic member 95 is held by an inner side of the abutting part 1221 by the own adhesive force of the viscoelastic member 95. Further, the viscoelastic member 95 fitted to the inner side of the abutting part 1221 is vacuum-sucked by the suction part 1021 and is set in a state held by the conveyance head 1010.

Figure 10C:
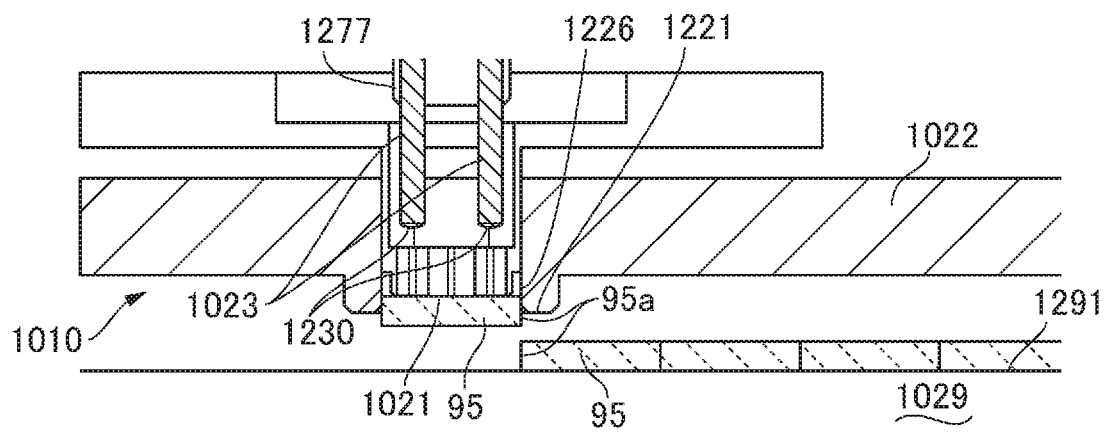

Next, when the lever 1024 shown in FIG. 8 is turned in the clockwise direction "CW", as shown in FIG. 10C, the conveyance head 1010 is moved upward and the desired viscoelastic member 95 is moved upward in a state held by the conveyance head 1010. On the other hand, adjacent viscoelastic members 95 located around the desired viscoelastic member 95 are left on the placing table 1029.

Figure 10D:
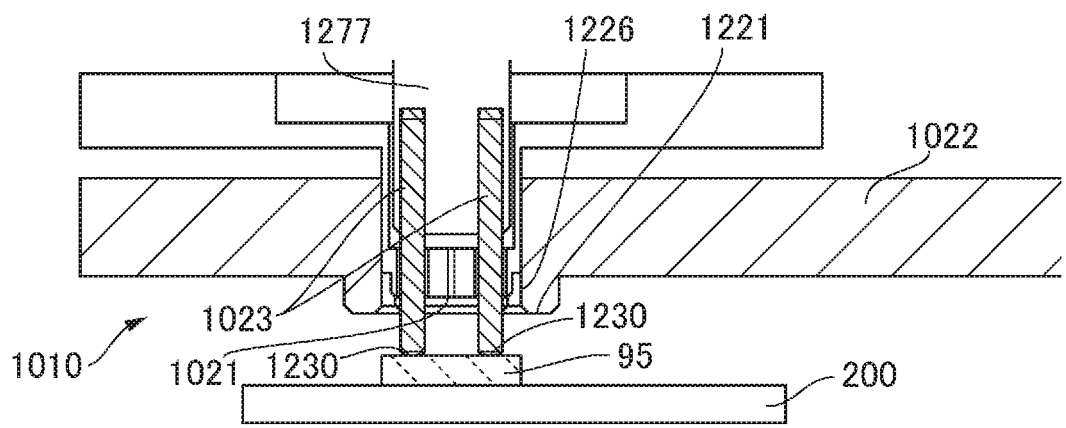
Figure 11:
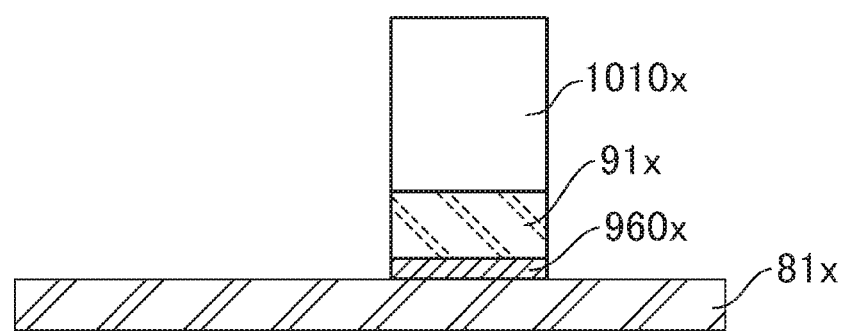
FIG. 11 is an explanatory view showing a manufacturing method of an actuator in a comparison example.

In this state, after the conveyance head 1010 has been moved to a position directly above a first jig 200 shown in FIG. 8, the lever 1024 shown in FIG. 8 is further moved in the clockwise direction "CW". As a result, the support plate 1025 and the abutting member 1022 are moved upward and, on the other hand, the shaft 1277 having the bar-shaped members 1023 is prevented from moving upward by abutting the bolt 1273 with the stopper 1274. Therefore, as shown in FIG. 10D, a lower end part 1230 of the bar-shaped member 1023 is protruded to a lower side from the abutting part 1221 and the viscoelastic member 95 is pressed on the first jig 200. After that, the lever 1024 shown in FIG. 8 is turned in the counterclockwise direction "CCW" to move the bar-shaped member 1023 upward.

Next, when the above-mentioned operations are repeated, a plurality of the viscoelastic members 95 can be conveyed sequentially.

In the conveyance device 1000 structured as described above, when the conveyance head 1010 is to be moved downward to hold a viscoelastic member 95, the abutting part 1221 of the abutting member 1022 is abutted from an upper side with a viscoelastic member 95 adjacent to the desired viscoelastic member 95 among a plurality of the viscoelastic members 95. Therefore, the abutting part 1221 applies a force against an adhesive force between the desired viscoelastic member 95 and the adjacent viscoelastic member 95. Therefore, when the conveyance head 1010 is to be moved upward for conveying the desired viscoelastic member 95, the desired viscoelastic member 95 is easily separated from the adjacent viscoelastic member 95 and thus, conveyance of the viscoelastic member 95 is easily performed. Further, the abutting part 1221 is provided so as to surround the suction part 1021 and thus, the conveyance head 1010 can surely hold the viscoelastic member 95 through vacuum suction of the viscoelastic member 95 by the suction part 1021 and holding of the viscoelastic member 95 on an inner side of the abutting part 1221.

Also in this case, when the viscoelastic member 95 is to be separated from the conveyance head 1010, the bar-shaped member 1023 is protruded to a lower side with respect to the suction part 1021 and the bar-shaped member 1023 applies a force against an adhesive force between the viscoelastic member 95 and the conveyance head 1010. Therefore, the viscoelastic member 95 is easily separated from the conveyance head 1010 and thus the viscoelastic member 95 is easily handled.

OTHER EMBODIMENTS

In the embodiment described above, as an example, the viscoelastic member 91 is adhesively bonded to the first yoke 81 of the movable body 6 and the first plate 47 of the support body 2, and the viscoelastic member 92 is adhesively bonded to the second yoke 82 of the movable body 6 and the second plate 48 of the support body 2. However, at least an embodiment of the present disclosure may be applied to a case that a viscoelastic member is adhesively bonded to another member of the movable body 6 and another member of the support body 2.

In the embodiment described above, as an example, the method described with reference to FIG. 7 is applied when a viscoelastic member is to be adhesively bonded to a member structuring the movable body 6 before a viscoelastic member is adhesively bonded to a member structuring the support body 2. However, the method described with reference to FIG. 7 may be applied to a case that a viscoelastic member is to be adhesively bonded to a member structuring the support body 2 before a viscoelastic member is adhesively bonded to a member structuring the support movable body 6.

In the embodiment described above, the viscoelastic members 91 and 92 are fixed to both of the support body 2 and the movable body 6 by an adhesive layer. However, the viscoelastic members 91 and 92 may be fixed to only one of the support body 2 and the movable body 6 by an adhesive layer (first adhesive layer).

In the embodiment described above, the viscoelastic members 91 and 92 are respectively fixed to the support body 2 and the movable body 6 by an adhesive layer. However, only one of the viscoelastic members 91 and 92 may be fixed to the support body 2 and the movable body 6 by an adhesive layer.

In the embodiment described above, a gel-state member such as silicone gel is used as the viscoelastic members 91 and 92. Viscoelasticity is a property provided with both of viscosity and elasticity and remarkably found in high molecular material such as gel-state member, plastic and rubber. Therefore, at least an embodiment of present disclosure may be applied to cases that various rubber materials such as natural rubber, diene-based rubber (for example, styrene butadiene rubber, isoprene rubber, butadiene rubber, chloroprene rubber, acrylonitrile butadiene rubber), non-diene-based rubber (for example, butyl rubber, ethylene propylene rubber, ethylene propylene diene rubber, urethane rubber, silicone rubber, fluorine-containing rubber), thermoplastic elastomer and their denatured materials are used as the viscoelastic members 91 and 92. In this case, an adhesive force of a gel-state member is larger than those of other viscoelastic members and thus the effect of the gel-state member when at least an embodiment of the present disclosure is applied is remarkable.

In the embodiment described above, a coil is provided in the support body 2 and a permanent magnet is provided in the movable body 6. However, at least an embodiment of the present disclosure may be applied to an actuator in which a coil is provided in the movable body 6 and a permanent magnet is provided in the support body. In the embodiment described above, an actuator is described, as an example, in which the movable body 6 is vibrated in the second direction "X". However, at least an embodiment of the present disclosure may be applied to an actuator in which the movable body 6 is vibrated in the second direction "X" and the third direction "Y".

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. A manufacturing method for adhesively bonding a viscoelastic member to a side member of a support body of an actuator, or for adhesively bonding the viscoelastic member to a movable body of the actuator, wherein the actuator comprises the side member, the support body and the moveable body, the manufacturing method comprising: a first step, in which the viscoelastic member is disposed on a face of a first jig; a second step, in which the viscoelastic member and the side member or the viscoelastic member and the movable body are adhered with each other through an adhesive therebetween, wherein the actuator comprises a magnetic drive circuit configured to relatively move the movable body with respect to the support body; a third step, in which the adhesive is hardened to adhesively bond the side member and the viscoelastic member or the movable body and the viscoelastic member to each other; and a fourth step, in which the first jig is separated from the viscoelastic member, wherein in the first step, a conveyance head disposes the viscoelastic member on the face of the first jig, and prior to the second step, the conveyance head is separated from the viscoelastic member.

2. The manufacturing method according to claim 1, further comprising: disposing the side member on a face of a second jig prior to the second step, and in the second step, the first jig and the second jig are overlapped with each other, so that the viscoelastic member and the side member are adhered with each other through the adhesive.

3. The manufacturing method according to claim 2, wherein the first step comprises disposing a plurality of the viscoelastic members on the face of the first jig, the second step comprises disposing a plurality of the side members on the face of the second jig, and in the second step, the first jig and the second jig are overlapped with each other, so that the plurality of the viscoelastic members and the plurality of the side members are respectively adhered with each other through the adhesive.

4. The manufacturing method according to claim 3, wherein in the second step, the face of the second jig is set to face upward and the face of the first jig is set to face downward.

5. The manufacturing method according to claim 1, wherein the conveyance head comprises: a suction part, configured to vacuum-suck the viscoelastic member; and a bar-shaped member, configured to move between an upper position where the bar-shaped member retracts more upward than the suction part and a lower position where the bar-shaped member protrudes more downward than the suction part, and when the conveyance head is to be separated from the viscoelastic member, the bar-shaped member protrudes more downward than the suction part.

6. The manufacturing method according to claim 1, wherein the viscoelastic member is a gel-state member.

7. The manufacturing method according to claim 1, wherein after the fourth step, another side member of the support body is adhesively bonded to the viscoelastic member by another adhesive layer.

8. The manufacturing method according to claim 4, wherein the conveyance head comprises: a suction part, configured to vacuum-suck the viscoelastic member; and a bar-shaped member, configured to move between an upper position where the bar-shaped member retracts more upward than the suction part and a lower position where the bar-shaped member protrudes more downward than the suction part, and when the conveyance head is to be separated from the viscoelastic member, the bar-shaped member protrudes more downward than the suction part.

9. The manufacturing method according to claim 8, wherein the viscoelastic member is a gel-state member.

10. The manufacturing method according to claim 8, wherein after the fourth step, another side member of the support body is adhesively bonded to the viscoelastic member by another adhesive layer.

* * * * *